United States Patent [19]
Miller, Jr.

[11] 3,732,626
[45] May 15, 1973

[54] SPLINE WEAR MEASUREMENT GAGE

[75] Inventor: John W. Miller, Jr., Alexandria, Va.

[73] Assignee: The United Stated of America as represented by the Secretary of the Navy

[22] Filed: Jan. 22, 1969

[21] Appl. No.: 793,149

[52] U.S. Cl. .......................................... 33/179.5 R
[51] Int. Cl. ............................................... G11b 5/16
[58] Field of Search ...................... 33/174 A, 179.5, 33/179.53, DIG. 14; 73/162

[56] References Cited

UNITED STATES PATENTS 3,507,049   4/1970   Heldt et al. ........................... 33/179.5

Primary Examiner—William D. Martin, Jr.
Assistant Examiner—Dennis A. Dearing
Attorney—E. J. Brower, Arthur L. Branning and Thomas O. Watson

[57] ABSTRACT

An involute-spline, wear-step measurement gage comprising three coaxial and relatively rotatable splines. Springs are provided to bias a first spline in one rotary direction and the other two splines in the opposite direction when the gage has been placed on or in the spline to be measured and actuated. The first spline engages the unworn (non-drive) surface of the spline being measured and the other two splines are of different radial dimensions so that one of them engages the wear step and the other engages the unworn portion of the original involute, i.e., the form clearance, adjacent the wear step. A dial indicator arrangement registers the difference in positioning of these latter two splines in terms of the magnitude of the wear step.

6 Claims, 7 Drawing Figures

SPLINE WEAR MEASUREMENT GAGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to spline measuring gages and more particularly to involute-spline, wear step measuring gages.

In the past, three principal methods have been utilized for measuring wear on spline couplings. These methods have been (1) the use of a set or sets of "Go" and "No-Go" gages; (2) the comparison of space width with some arbitrary dimension; and (3) the measurement of worn and unworn sections by use of a micrometer and pins.

The use of "Go" and "No-Go" gages will enable the rejection of splines with excessive wear, but does not enable the user to measure actual wear which would be useful in estimating the remaining life of a spline. Furthermore, since a pair of gages is required for each dimension being checked, an additional pair of gages would be necessary for each variation in wear allowance even though the basic data (i.e., number of teeth, pitch, pressure angle and pitch diameter) of the spline remained constant.

The comparison of space width with some arbitrary dimension is deficient in that the comparison dimension is unrelated to actual wear. Consider a 12-tooth, 20/40 pitch, 0.600 inch pitch diameter external spline with a wear allowance of 0.003 inch. The chordal space width at the pitch diameter for this spline is 0.0730 inch $^{+0.0030}_{-0.0000}$, according to AND 10260. Obviously, selection of the minimum or maximum space width for comparison will never indicate the amount of actual wear. In fact, in the example given, the wear determination could be in error as much as 0.003 inch and result in rejection of a new unworn spline or acceptance of a spline with excessive wear. Thus, arbitrary selection of any dimension for comparison will not allow determination of actual wear.

The third method is practiced by placing a pair of cylindrical pins in diametrically opposed spaces on a spline and measuring their separation by means of a micrometer. If similar measurements are taken on both the worn and unworn profiles, the difference in micrometer measurements can be used to calculate the actual wear. However, due to the mathematical complexity of involute curves, such calculations are not within the ability of a person having only a limited background in mathematics. Also, an additional mathematical factor is introduced whenever the spline being measured has an odd number of teeth since in this case there will be no pairs of spaces which are diametrically opposed.

SUMMARY OF THE INVENTION

The general purpose of this invention is to provide a gage which posesses all the advantages of similarly employed gages or techniques and yet has none of the aforedescribed disadvantages. To this end, the gage of the present invention employs a technique which involves direct comparison between the worn profile and the original profile to determine the decrease in tooth thickness, i.e., the magnitude of the wear step. This technique is based on the fact that there is always an unworn region of the original involute remaining and uses this unworn region as a reference, comparing the worn profile to the reference. This unworn region results from the normal provision of clearance between mating parts and is commonly termed form clearance. By using that portion of the tooth which retains the original profile as a reference, all of the manufacturing tolerances and errors which existed on the original unworn profile are injected into the wear determination. Thus, there is nothing arbitrary about the wear determination and the wear step is measured as it actually exists.

OBJECTS OF THE INVENTION

It is a primary object of this invention to provide a new and improved wear measurement gage for involute splines.

It is another object of this invention to provide a spline wear measurement gage capable of direct wear measurements.

It is a further object of this invention to provide a gage capable of measuring wear steps on either internal or external involute splines.

It is yet another object of this invention to provide a gage capable of comparing the worn profile to the unworn profile on an involute spline in order to obtain a direct measurement of the magnitude of the wear step.

BRIEF DESCRIPTION OF THE DRAWINGS

Other objects, advantages and novel features of the invention will become readily apparent upon consideration of the following detailed description when read in conjunction with the accompanying drawings wherein.

DESCRIPTION OF THE PREFERRED EMBODIMENTS

Internal Spline Gage

Figure 1:
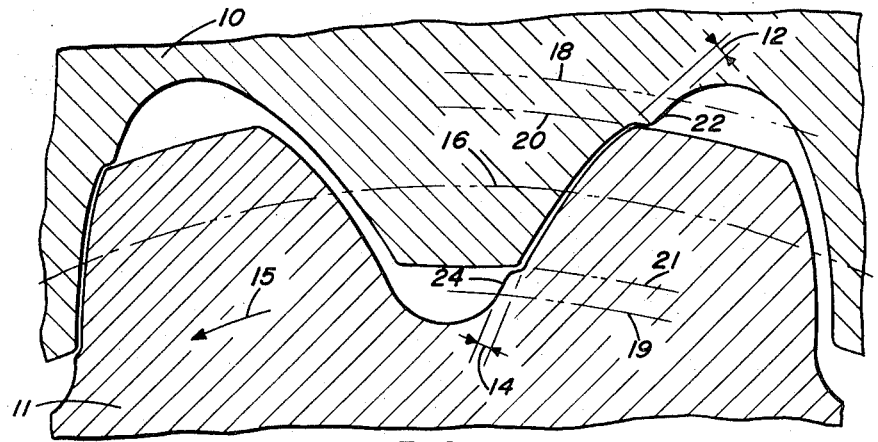
FIG. 1 is a fragmentary sectional view of a spline coupling illustrating wear steps worn on both the internal and external splines.

Attention now is directed to the drawings, wherein like numerals of reference designate like parts throughout the several views, and more particularly to FIG. 1 wherein is shown a section through a segment of a splined coupling comprising an internal spline 10 and an external spline 11. These splines exhibit wear steps, designated 12 and 14, respectively, such as would result from extended operation with the external spline 11 driving the internal spline 10 in the direction of the arrow 15, or vice versa. Arc 16 represents the pitch diameter of both splines. Arcs 18 and 19 represent the form diameters of the internal and external splines, respectively; the form diameter being the maximum depth to which the true involute form is machined during manufacture. In order to accommodate manufacturing tolerances and insure a proper fit of mating splines, the form diameter 18 is always made larger than the major diameter 20 of the spline 11 and the form diameter 19 is always made smaller than the major diameter 21 of the spline 10. The difference between each of these pairs of diameters is known as form clearance. Thus, segments 22 and 24 of splines 10 and 11, respectively, will always retain their original involute form despite the formation of wear steps 12 and 14 due to extended use. It is the unvarying existence of these segments of unworn involute upon which the present invention is predicated.

Figure 2:
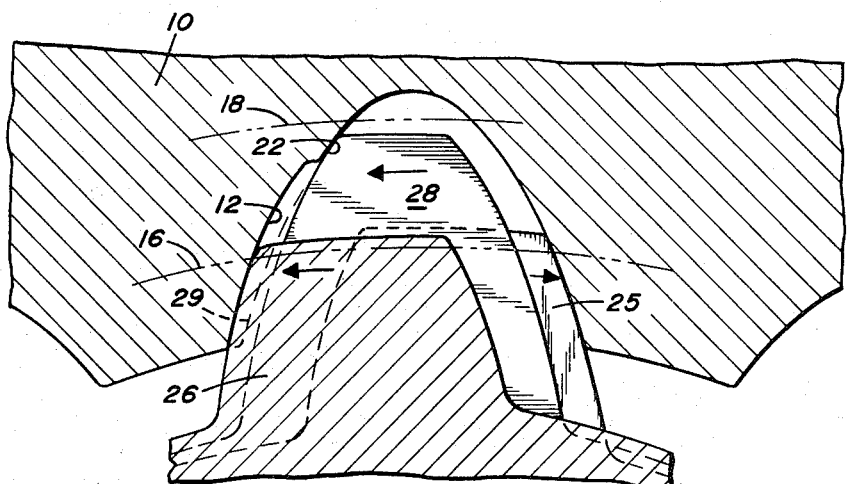
FIG. 2 illustrates the manner in which the gaging members of the present invention are positioned to measure the wear step on an internal spline.

Referring now to FIG. 2, there can be seen the internal spline 10 with the gaging elements of the present invention in their operative positions. These elements comprise a locking member 25, a fixed member 26 and a gaging member 28; all of involute spline configuration. A dotted line 29 represents the original profile of the spline 10 prior to formation of the wear step 12. It can be seen that the locking member 25 engages the unworn (non-drive) surface of an adjacent tooth while the fixed member 26 and gaging member 28 engage the wear step 12 and form clearance 22, respectively. The relative displacement of the members 26 and 28 is a measure of the magnitude of the wear step 12 along the pitch diameter 16.

Figure 3:
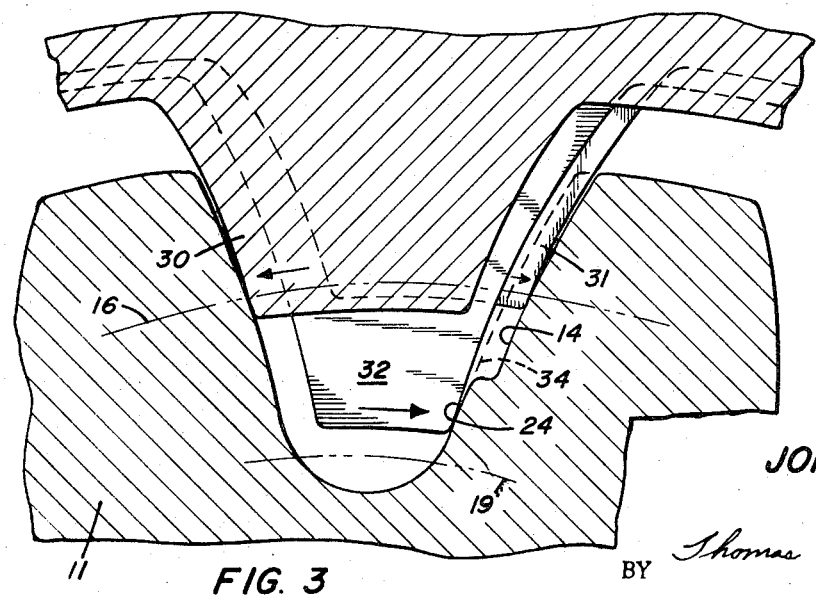
FIG. 3 is a view similar to FIG. 2 illustrating the gaging members contacting the teeth of an external spline.

FIG. 3 is a view similar to FIG. 2 and shows the external spline 11 with analogus gaging elements in contact therewith. These gaging elements comprise a locking member 30, a fixed member 31 and a gaging member 32; all of involute spline configuration. A dotted line 34 represents the original profile of the spline 11 prior to formation of the wear step 14. In a manner similar to that shown in FIG. 2, the locking member 30 engages the unworn (non-drive) surface of an adjacent tooth while the fixed member 31 and gaging member 32 engage the wear step 14 and form clearance 24, respectively. The relative displacement of the members 31 and 32 is a measure of the magnitude of the wear step 14 along the pitch diameter 16.

Figure 5:
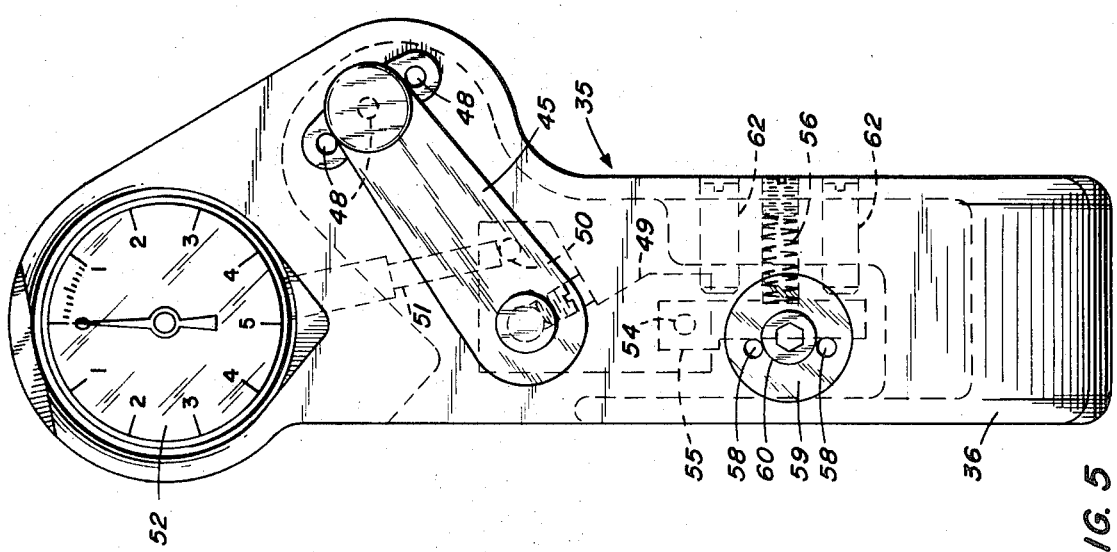
FIG. 5 is an end elevation, partially sectioned, of FIG. 4 and shows the internal mechanism of the gage.
Figure 4:
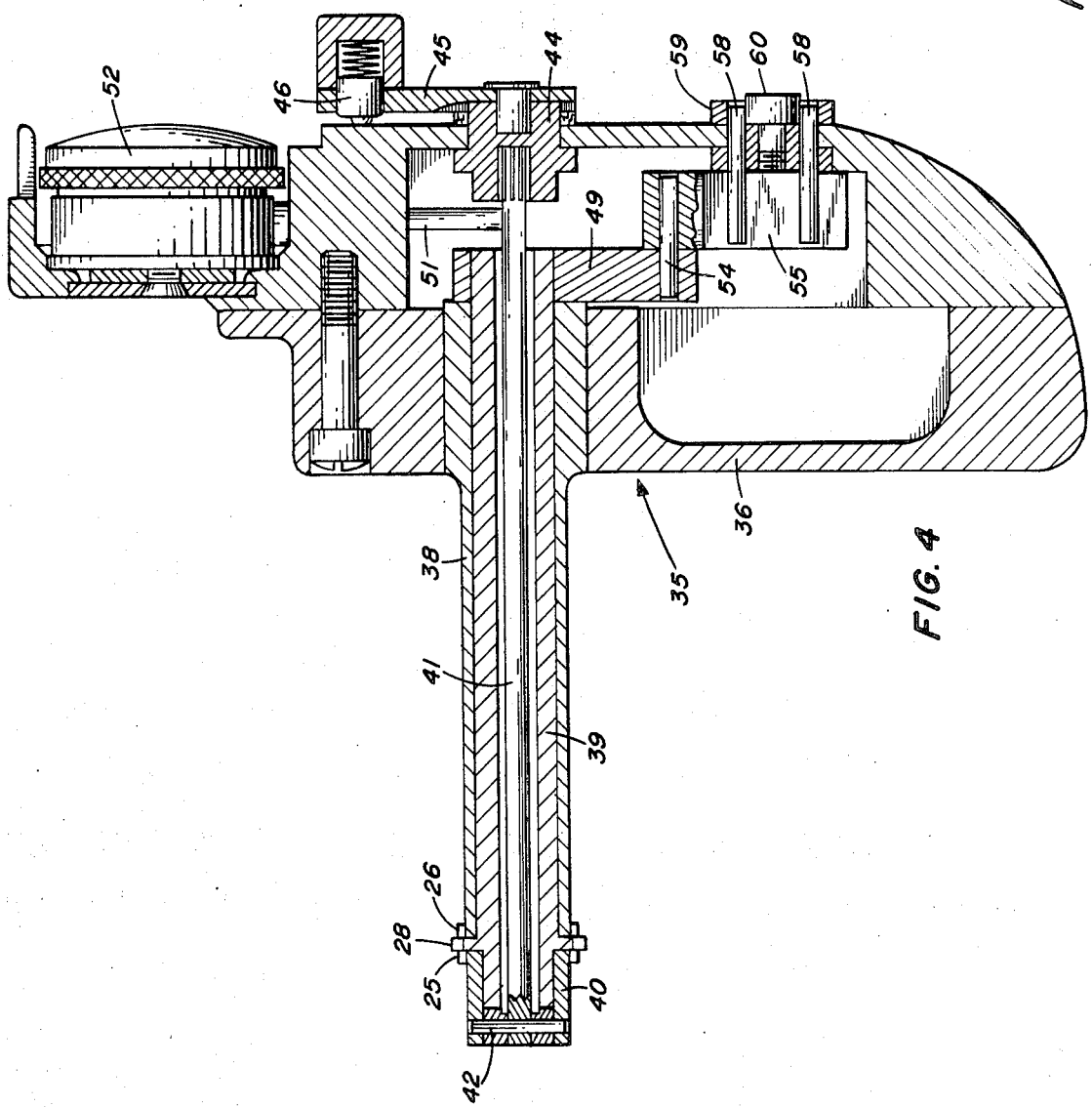
FIG. 4 is a sectional view of a gage according to the present invention for measuring wear steps on internal splines as illustrated in FIG. 2.

Referring now to FIGS. 4 and 5, there can be seen an internal spline gage, designated generally by the reference numeral 35, on which are mounted the gaging elements 25, 26 and 28. The gage 35 comprises a housing 36 having fixed thereto a hollow shaft 38, on the end of which is formed the fixed member 26. A gaging shaft 39 is rotatably disposed within the shaft 38 and has the gaging member 28 formed thereon adjacent the fixed member 26 on the shaft 38. A sleeve 40 is rotatably disposed on a reduced end portion of the shaft 39 and has the locking member 25 formed thereon adjacent the gaging member 28. A torsion bar 41 is disposed within a central bore in the shaft 39 and is connected to the sleeve 40 by means of a pin 42. The opposite end of the torsion bar 42 is fixed to a hub 44 rotatably mounted in an aperture formed in the wall of the housing 36.

An actuating lever 45 is fixed to the hub 44 and carries a spring loaded plunger 46. The plunger 46 is adapted to engage one of three recesses 48, in the housing 36, which cooperate with the plunger to form a detent arrangement. The lever 45 is shown in the neutral or non-gaging position in FIG. 5.

A crank 49 is fixed to the inner end of the shaft 39 and carries a pin 50 which serves to actuate a piston 51 of a dial indicator gage 52 upon rotary movement of the crank 49. The face of the dial indicator 52 is made movable for zeroing and adjusting purposes. The lower end of the crank 49 carries a fixed pin 54 upon which is pivoted a biasing lever 55. A compression spring 56 is disposed in an aperture in the housing 36 and normally urges the lever 55 into engagement with a pair of aligning pins 58. The pins 58 are fixed in a plug 59 which may be rotated with respect to the housing for purposes of initial adjustment of the gage and then locked in place by means of a screw 60. A pair of set screws 62 are provided in the housing 36 to limit the maximum movement of the lever 55 away from the pins 58.

Operation of Internal Spline Gage

In order that a better understanding of this embodiment of the invention may be had, its mode of operation will now be described. With the lever 45 in the position shown in FIG. 5, the gage is inserted into the internal spline 10 to be measured until the gaging members 25, 26 and 28 are all within the spline 10. The lever 45 is then moved either clockwise or counter-clockwise, depending upon which side of the spline teeth the wear step is on, until the plunger 46 engages one of the extreme recesses 48. This movement applies a torque to the torsion shaft 41 through the hub 44. Torsion of the shaft 41 in turn causes rotation of the sleeve 40 and locking member 25 through the pin 40 and moves the locking member 25 into engagement with a non-drive surface on the teeth of the spline 10 as shown in FIG. 2. The reaction to the torsion of shaft 41 will cause the housing 36 and the fixed and gaging members, 26 and 28 respectively, to rotate in the opposite direction relative to the spline 10. As this movement occurs, the gaging member 28 will first contact the form clearance 22 and stop while the movement continues until the fixed member 26 engages the wear step 12. Rotation of the housing 36 after the gaging member 28 engages the form clearance 22 causes the lever 55 to lift away from one of the pins 58 and in effect pivot about the other against the urging of the spring 56. This in turn causes movement of the crank 49 relative to the housing 36 and consequent movement of the piston 51 of the dial indicator 52 through the action of the pin 50 fixed to the crank 49. The dimensions of the crank 49 and lever 55 and the positioning of the pin 50 and the axis of the piston 51 are so selected that the dial indicator 52 will read directly the magnitude of the wear step 12 along the pitch diameter 16.

External Spline Gage

Figure 7:
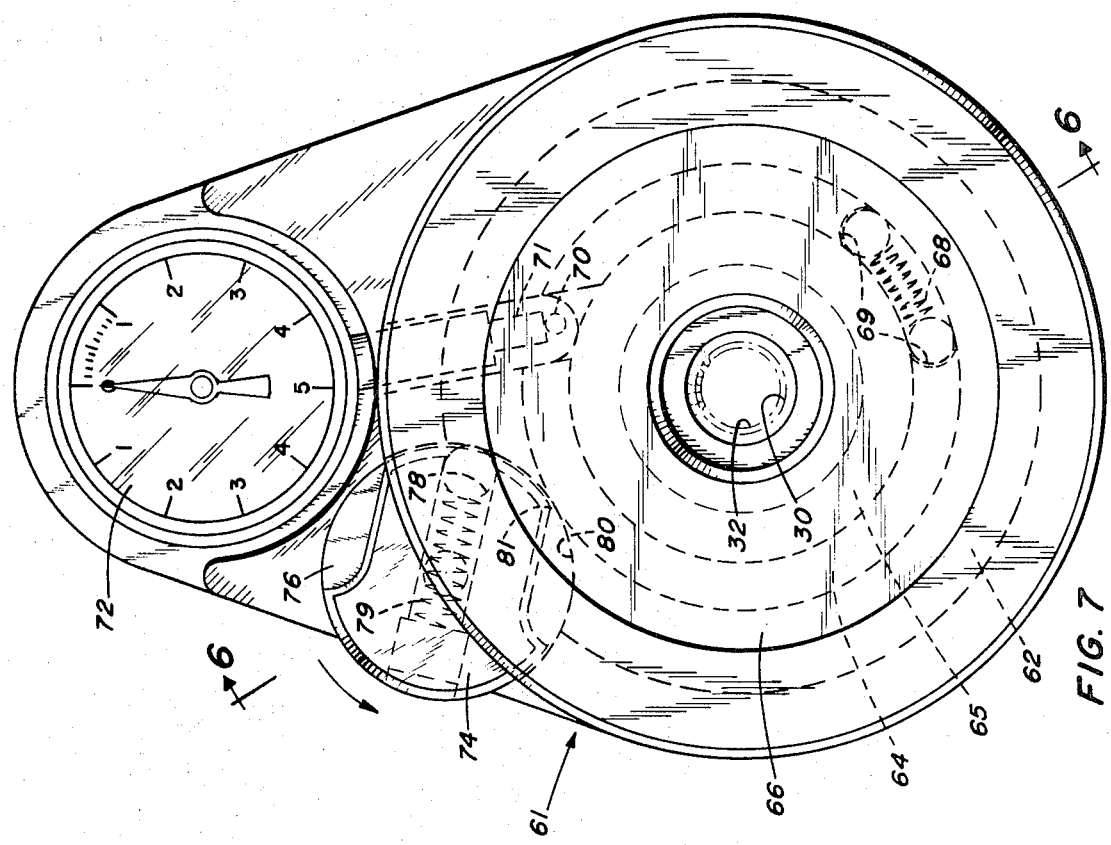
FIG. 7 is an end elevation, partially sectioned, of FIG. 6 and shows the internal mechanism of the gage.
Figure 6:
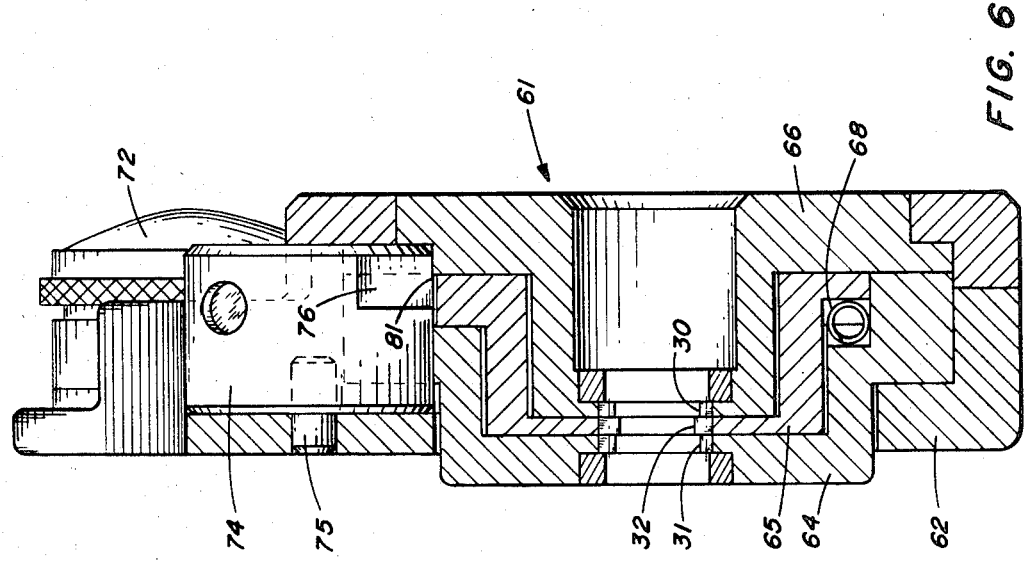
FIG. 6 is a sectional view of a gage according to the present invention for measuring wear steps on external splines as illustrated in FIG. 3.

Referring now to FIGS. 6 and 7, there can be seen an external spline gage, designated generally by the reference numeral 61, on which are mounted the gaging elements 30, 31 and 32. The gage 61 comprises a housing 62 having fixed therein a cup-like member 64, within the bottom of which is formed the fixed member 31. A second cup-like member 65 is rotatably disposed within the member 64 and has the gaging member 32 formed in the bottom thereof. A third cup-like member 66 is rotatably disposed within the member 65 and has the locking member 30 formed in the bottom thereof.

A compression spring 68 and a pair of balls 69 are disposed within a space defined by arcuate recesses formed in the members 64 and 65 and normally serve to cause the member 65 to rotate in the same direction as the member 64. A pin 70 is fixed to the member 65 and engages a piston 71 of a dial indicator gage 72 which is fixed to the housing 62. The dial indicator face is movable for zeroing and adjusting purposes.

An actuator 74 is mounted for rotation on the housing 62 by means of a pivot pin 75. The actuator 74 is generally cylindrical in configuration except for a pair of cut away portions 76 formed on opposite sides thereof. The actuator 74 is provided with a transverse bore within which are disposed a ball 78 and a compression spring 79. The member 66 is provided with an arcuate indentation 80 in the periphery thereof which is of substantially the same radius as the actuator 74 and adjacent thereto.

Operation of External Spline Gage

To facilitate understanding of this embodiment of the invention, its mode of operation will now be described. The spline 11 to be measured is first inserted into the gage 61 until all three gaging elements 30, 31 and 32 are on the spline 11. The actuator 74 is then rotated clockwise or counter-clockwise, depending upon which side of the spline teeth the wear step is on. For purposes of illustration, counter-clockwise movement is shown in FIG. 7. As the axis of the spring 79 is moved from a line intersecting the axes of the members 64, 65 and 66, the neutral position, the spring 79 and ball 78 engage the arc 80 and tend to move the member 66 clockwise as shown in FIG. 7. However, engagement of the unrelieved portion of the actuator 74, between the cut away portions 76, precludes movement of the member 66 until the actuator 74 reaches the position shown in FIG. 7. As a corner 81 passes the point of tangency between the actuator 74 and member 66, the member 66 becomes free to rotate in a clockwise direction. The member 66 will rotate under the urging of the spring 79 and ball 78 until the locking member 30 engages a non-drive surface of the spline 11 as shown in FIG. 3. The reaction to the force of the spring 79 will cause the housing 62 and the fixed and gaging members, 31 and 32 respectively, to rotate in the opposite direction relative to the spline 11. As this movement occurs, the gaging member 32 will first contact the form clearance 24 and stop while the movement continues until the fixed member 31 engages the wear step 14. Rotation of the housing 62 after the gaging member 32 engages the form clearance 24 and in effect rotates the member 65 relative to the housing 62. Since the dial indicator 72 is fixed to the housing 62 and the pin 70 is carried by the member 65, this relative movement will cause axial movement of the piston 71 and consequently a reading can be made from the dial indicator 72. The dimensions of the member 65 and the positions of the pin 70 and the axis of the piston 71 are so selected that the dial indicator 72 will read directly the magnitude of the wear step 14 along the pitch diameter 16.

It is to be understood that the above described embodiments are simply illustrative of the principles of the present invention. Numerous other arrangements may be readily devised by those skilled in the art which still utilize the principal features of the present invention and fall within the spirit and scope thereof.

What is claimed is:

1. In a spline wear gage, the combination comprising a body,
   a first gage member having circumferentially spaced teeth,
   a second gage member having circumferentially spaced teeth,
   said members being coaxially aligned and in one position having the teeth thereof axially aligned,
   the addendum on at least one of the teeth on one of said gage members being longer than the addendum of the teeth on the other of said gage members,
   whereby when said gage is brought into position adjacent a spline to be gaged and said members are rotated relative to one another, the addendum of the teeth of one of the members will engage the teeth of the spline being gaged at one portion thereof and the addendum of the teeth on the other of said gage members will engage the teeth of the spline being gaged at another point radially of the teeth so that the relative displacement angularly of the members will be a measure of the wear of the teeth.

2. The combination set forth in claim 1 including means to yieldingly urge said members into the position wherein said teeth are axially aligned.

3. The combination set forth in claim 2 including means operable to yieldingly urge said gage members circumferentially relative to one another.

4. The combination set forth in claim 1 wherein said teeth on said gage members extend radially inwardly for gaging an external spline.

5. The combination set forth in claim 1 wherein said teeth on said gage members extend radially outwardly for gaging an internal spline.

6. The combination set forth in claim 1 including means for normally holding said gage members with the teeth in axial alignment,
   said means being responsive to relative movement of the gage members to yieldingly urge the gage members apart.

* * * * *